United States Patent
Kanzaki et al.

(10) Patent No.: US 7,282,537 B2
(45) Date of Patent: Oct. 16, 2007

(54) PROPYLENE-BASED POLYMER, POLYPROPYLENE RESIN COMPOSITION, AND INJECTION MOLDED ARTICLE

(75) Inventors: Susumu Kanzaki, Kisarazu (JP); Kazuki Wakamatsu, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 208 days.

(21) Appl. No.: 10/988,520

(22) Filed: Nov. 16, 2004

(65) Prior Publication Data

US 2005/0154131 A1    Jul. 14, 2005

(30) Foreign Application Priority Data

Nov. 18, 2003   (JP)   ............................... 2003-387520

(51) Int. Cl.
C08L 53/00 (2006.01)
C08L 23/10 (2006.01)
C08L 23/16 (2006.01)
C08F 210/00 (2006.01)

(52) U.S. Cl. .................... 525/95; 525/240; 526/348
(58) Field of Classification Search ................ 525/95, 525/240; 526/348
See application file for complete search history.

(56) References Cited

U.S. PATENT DOCUMENTS

| | | | |
|---|---|---|---|
| 3,911,052 A * | 10/1975 | Castagna et al. ............ 525/268 |
| 5,556,910 A * | 9/1996 | Harada et al. ............... 524/504 |
| 6,204,336 B1 * | 3/2001 | Hirakawa et al. ........... 525/244 |
| 6,639,002 B2 * | 10/2003 | Okawa et al. ............... 524/442 |
| 6,716,921 B1 * | 4/2004 | Nakashima et al. ........ 525/191 |
| 2002/0035191 A1 * | 3/2002 | Hirakawa et al. ........... 524/451 |
| 2004/0014871 A1 | 1/2004 | Zanka et al. |

FOREIGN PATENT DOCUMENTS

JP    2002-194023 A    7/2002

* cited by examiner

*Primary Examiner*—Nathan M. Nutter
(74) *Attorney, Agent, or Firm*—Sughrue Mion, PLLC (57) ABSTRACT

Disclosed is a propylene-based polymer including from 51 to 75% by weight of a propylene-ethylene random copolymer component (A) having an intrinsic viscosity $[\eta]^A$, measured in tetralin at 135° C., of 5 dl/g or more and an ethylene content of not less than 8% by weight but less than 20% by weight, and from 25 to 49% by weight of a propylene-based polymer component (B) obtained by polymerizing monomers mainly including propylene, the component having an intrinsic viscosity $[\eta]^B$, measured in tetralin at 135° C., of 1.2 dl/g or less, wherein said amounts of the components (A) and (B) are each based on the combined weight of these components.

3 Claims, 1 Drawing Sheet

Fig. 1

PROPYLENE-BASED POLYMER, POLYPROPYLENE RESIN COMPOSITION, AND INJECTION MOLDED ARTICLE

This application claims benefit of priority based on Japanese Patent Application No. 2003-387520, filed Nov. 18, 2003, the entire disclosure of which is hereby incorporated by reference.

BACKGROUND OF THE INVENTION

1. Technical Field

The present invention relates to a propylene-based polymer, to a polypropylene resin composition containing the polymer and to an injection-molded article comprising the composition. In particular, the present invention relates to a polypropylene resin composition having a high die swell ratio such that when being injection-molded, it is difficult for flow marks to occur. The resulting molded article has a good weld appearance, and it is difficult for sinking (facial strain) to occur in the surface of the molded article. A good injection filling property is achieved, and hard spots are inhibited to occur in the molded article. The present invention relates also to a propylene-based polymer suitable as a component of the above-mentioned polypropylene resin composition and to an injection molded article made of the composition.

2. Description of the Related Art

Polypropylene resin compositions are used for a wide variety of applications such as molded articles, e.g. automotive interior or exterior materials and electric appliance housings because they are materials excellent in rigidity, impact resistance and the like.

For example, JP-A-2002-194023, which is published also as U.S. 2004/0014871 A1, discloses a random propylene polymer capable of controlling the appearance and the moldability of a polypropylene resin composition with a good balance by compounding a small amount of propylene-ethylene block copolymer, a random propylene polymer having a die swell ratio of from 1.5 to 2.5, a ratio of the weight average molecular weight Mw to the number average molecular weight Mn (i.e. Q value: Mw/Mn) determined by gel permeation chromatography (GPC) of from 7 to 13. Specifically, JP-A-2002-194023 discloses a random propylene polymer obtained by two-stage polymerization comprising producing, in a first state, 70% by weight of a propylene homopolymer having an MFR of 150 g/10 min and then producing supplying a mixed gas of propylene and ethylene (ethylene content=6% by weight) in the presence of the polymer formed in during the first stage to produce 30% by weight portion of the whole polymer. Moreover, a polypropylene resin composition containing the random propylene polymer, and an injection-molded article made of the resin composition are also disclosed.

However, polypropylene resin compositions to be used for injection-molded articles have been required for further improvement, for example, controlling the occurrence of flow marks, in other words, increasing the die swell, improving the weld appearance, controlling the occurrence of sinking in the surface of a molded article to improve the injection filling property, and inhibiting the occurrence of hard spots. For such improvement, there is a demand for propylene-based polymer available for forming polypropylene resin compositions to be used for the production of injection-molded articles.

SUMMARY OF THE INVENTION

The object of the present invention is to provide:

a polypropylene resin composition having a high die swell ratio such that when being injection-molded, it is difficult for flow marks to occur, a resulting molded article has a good weld appearance, it is difficult for sinking (facial strain) to occur in the surface of the molded article, a good injection filling property is achieved, and hard spots are inhibited to occur in the molded article;

a propylene-based polymer suitable as a component of the above-mentioned polypropylene resin composition, and an injection-molded article made of the composition.

In one aspect, the present invention provides a propylene-based polymer comprising:

from 51 to 75% by weight of a propylene-ethylene random copolymer component (A) having an intrinsic viscosity $[\eta]^A$, measured in tetralin at 135° C., of 5 dl/g or more and an ethylene content of not less than 8% by weight but less than 20% by weight, and from 25 to 49% by weight of a propylene-based polymer component (B) obtained by polymerizing monomers mainly comprising propylene, the component having an intrinsic viscosity $[\eta]^B$, measured in tetralin at 135° C., of 1.2 dl/g or less, wherein said amounts of the components (A) and (B) are each based on the combined weight of these components.

In another aspect, the present invention provides a polypropylene resin composition comprising from 0.5 to 10% by weight of a propylene-based polymer defined below, and from 90 to 99.5% by weight of a polypropylene resin (C) defined below, wherein said amounts are each based on the combined weight of the propylene-based polymer and the polypropylene resin (C):

propylene-based polymer: a propylene-based polymer comprising from 51 to 75% by weight of a propylene-ethylene random copolymer component (A) having an intrinsic viscosity $[\eta]^A$, measured in tetralin at 135° C., of 5 dl/g or more and an ethylene content of not less than 8% by weight but less than 20% by weight, and from 25 to 49% by weight of a propylene-based polymer component (B) obtained by polymerizing monomers mainly comprising propylene, the component having an intrinsic viscosity $[\eta]^B$, measured in tetralin at 135° C., of 1.2 dl/g or less, wherein said amounts of the components (A) and (B) are each based on the combined weight of these components;

polypropylene resin (C): a crystalline ethylene-propylene block copolymer or a mixture of a crystalline ethylene-propylene block copolymer and a propylene homopolymer.

According to the present invention, a polypropylene resin composition is provided having a high die swell ratio such that when being injection-molded, it is difficult for flow marks to occur, a resulting molded article has a good weld appearance, it is difficult for sinking (facial strain) to occur in the surface of the molded article, a good injection filling property is achieved, and hard spots are inhibited to occur in the molded article. In addition, a propylene-based polymer suitable as a component of the above-mentioned polypropylene resin composition, and an injection-molded article made of the composition, can also be obtained.

DESCRIPTION OF PREFERRED EMBODIMENTS OF THE INVENTION

The propylene-based polymer of the present invention comprises a propylene-ethylene random copolymer component (A) and a propylene-based polymer component (B) obtained by polymerizing monomers mainly comprising propylene.

The propylene-ethylene random copolymer component (A) is a propylene-ethylene random copolymer obtained by propylene and ethylene.

The ethylene content of the component (A) is not less than 8% by weight but less than 20% by weight, and preferably from 10 to 15% by weight. If the ethylene content is less than 8% by weight, it may be impossible to prevent flow marks from being noticeable sufficiently or it may be impossible to prevent sinking (strain in surface) sufficiently. On the other hand, if it is 20% by weight or more, many hard spots may be formed in a molded article due to insufficient dispersion of the component (A) when such a propylene-based polymer is molded.

Component (A) has an intrinsic viscosity $[\eta]^A$, measured in tetralin at 135° C., of 5 dl/g or higher, and preferably 6 dl/g in view of the die swell of the polypropylene resin composition of the present invention and to prevent the occurrence of flow marks in the injection molding of the resin composition. The intrinsic viscosity is preferably up to 15 dl/g. In view of the dispersibility of component (A) and the weld appearance, the intrinsic viscosity is more preferably from 6 to 15 dl/g.

The propylene-based polymer component (B) is a propylene-based polymer obtained by polymerizing monomers, which mainly comprise propylene. The proportion of propylene in all the monomers is generally 80% by weight or more. Specific examples of the component (B) include (1) propylene homopolymers, (2) propylene-ethylene random copolymers, (3) propylene-α-olefin random copolymers obtained by copolymerizing propylene and an α-olefin having from 4 to 12 carbon atoms, and (4) propylene-ethylene block copolymers.

With respect to the propylene-ethylene random copolymers (2), the ethylene content is usually from 0.5 to 10% by weight, and preferably from 0.5 to 7% by weight.

Examples of the α-olefin having from 4 to 12 carbon atoms in the propylene-α-olefin random copolymers include butene-1, pentene-1, hexene-1,4-methylpentene-1, octene-1 and decene-1. The α-olefin content is usually from 1 to 20% by weight, and preferably from 2 to 15% by weight.

With respect to the propylene-ethylene block copolymers (4), the ethylene content is usually from 2 to 20% by weight, and preferably from 3 to 18% by weight.

Component (B) has an intrinsic viscosity $[\eta]^B$, measured in tetralin at 135° C., of up to 1.2 dl/g or higher, preferably from 0.6 to 1.2 dl/g, and more preferably from 0.8 to 1.1 dl/g.

If the intrinsic viscosity $[\eta]^B$ of component (B) is over 1.2 dl/g, a polypropylene resin composition containing the propylene-based polymer may have a reduced melt flow rate (MFR) or reduced fluidity.

The content of the propylene-ethylene random copolymer component (A) contained in the propylene-based polymer of the present invention is from 51 to 75% by weight and preferably from 51 to 70% by weight. In other words, the content of the propylene-based polymer component (B) is from 25 to 49% by weight and preferably from 30 to 49% by weight. Note that the contents of the propylene-ethylene random copolymer component (A) and the propylene-based polymer component (B) are each based on the combined amounts of these components.

If the content of component (A) is less than 51% by weight, many hard spots may occur due to insufficient dispersion of component (A) or it may be impossible to prevent flow marks from occurring sufficiently because a high die swell is not achieved.

If the content of component (A) is over 75% by weight, the propylene-based polymer of the present invention, or a polypropylene resin composition containing the propylene-based polymer of the present invention, may have a reduced melt flow rate (MFR) or reduced fluidity.

The melt flow rate (MFR) of the propylene-based polymer of the present invention is usually up to 3 g/10 min and, from the viewpoint of the dispersibility of component (A), preferably from 0.01 to 2 g/10 min.

It is possible to prepare the propylene-based polymer of the present invention by a known polymerization method using a known polymerization catalyst under appropriately selected conditions.

One example of known polymerization catalysts that are suitable for use in the production of the propylene-based polymer of the present invention is a catalyst comprising (a) a solid catalyst component containing magnesium, titanium, halogen and an electron donor as essential ingredients, (b) an organoaluminum compound and (c) an electron-donating component. Examples of the method for preparing this catalyst include those disclosed in JP-A-1-319508, JP-A-7-216017 and JP-A-10-212319.

For the production of the propylene-based polymer of the present invention, the following known polymerization methods may be used: bulk polymerization, solvent polymerization, slurry polymerization, gas phase polymerization, or the like. These may be conducted batchwise or continuously. Moreover, these may be optionally combined.

One preferred example is a continuous polymerization comprising:

providing two or more polymerization reactors arranged in series;

in a first reactor, copolymerizing propylene and ethylene to form a propylene-ethylene random copolymer component (A) in the presence of the above-mentioned catalyst system comprising a solid catalyst component containing magnesium, titanium, halogen and an electron donor, an organoaluminum compound and an electron-donating component;

transferring the resulting random copolymer component (A) to a second polymerization reactor;

in the second polymerization reactor, polymerizing monomers mainly comprising propylene to form a propylene-based polymer component (B) in the presence of the above-mentioned catalyst system. One more specific preferred example is a continuous polymerization comprising:

providing two or more polymerization reactors arranged in series;

in a first reactor, copolymerizing propylene and ethylene to form a propylene-ethylene random copolymer component (A) in the presence of the above-mentioned catalyst system comprising a solid catalyst component containing magnesium, titanium, halogen and an electron donor, an organoaluminum compound and an electron-donating component under conditions where the concentrations of ethylene and propylene are controlled so that a copolymer component having a desired ethylene content not less than 8% by weight but 20% by weight will be formed, in the absence of hydrogen, in the substantial absence of, or in the presence of hydrogen, which is a molecular weight regulator, of a concentration controlled so that a resulting copolymer component will have an intrinsic viscosity of not less than 5 dl/g;

transferring the resulting random copolymer component (A) to a second polymerization reactor;

in the second polymerization reactor, polymerizing monomers mainly comprising propylene to form a propylene-based polymer component (B) in the presence of the above-mentioned catalyst system while controlling the concentration of hydrogen so that a resulting polymer component will have an intrinsic viscosity of 1.2 dl/g or less. The expression "substantial absence of hydrogen" means that the reaction system should have a content of hydrogen not higher than about 10 parts per million (ppm), preferably not higher than about 5 ppm. From an industrial and economic viewpoint, preferred is continuous gas phase polymerization.

The amounts of the solid catalyst component (a), the organoaluminum compound (b), the electron-donating component (c), and the manners in which each catalyst component is fed into the polymerization reactors, may be determined appropriately according to conventional ways for using catalysts.

The polymerization temperature usually ranges from −30 to 300° C., and preferably from 20 to 180° C. The polymerization pressure is usually from an ambient pressure to 10 MPa, and preferably from 0.2 to 5 MPa. Use of, for example, hydrogen as a molecular weight regulator, is permitted.

In the production of the propylene-based polymer of the present invention, prior to polymerization (main polymerization), a preliminary polymerization may be carried out. One example of available preliminary polymerization is that in which polymerization is conducted in the presence of the solid catalyst component (a) and the organoaluminum compound (b), under feed of a small amount of propylene, in a slurry state using a solvent.

The polypropylene resin composition of the present invention comprises the aforementioned invented propylene-based polymer and a polypropylene resin (C) defined below.

[Polypropylene Resin (C)]

A crystalline ethylene-propylene block copolymer (i) or a mixture of the crystalline ethylene-propylene block copolymer (i) and a propylene-based polymer (ii).

The content of the propylene-based polymer in the polypropylene resin composition of the present invention is from 0.5 to 10% by weight and the content of the polypropylene resin (C) is from 90 to 99.5% by weight. Note that these amounts are each based on the combined amount of these two components. If the content of the propylene-based polymer is less than 0.5% by weight, it may be impossible to achieve a high die swell and, therefore, it may be impossible to prevent flow marks from occurring sufficiently. If it is over 10% by weight, the melt flow rate (MFR) may be reduced and, therefore, the melt fluidity may be reduced.

The crystalline ethylene-propylene block copolymer (i) is an ethylene-propylene block copolymer made up of a propylene homopolymer portion, which is referred to as a first segment of the copolymer (i), and an ethylene-propylene random copolymer portion, which is referred to as a second segment of the copolymer (i).

The propylene-based polymer (ii) may be a propylene homopolymer, a propylene-ethylene random copolymer or a propylene-α-olefin random copolymer, which is obtained by copolymerizing propylene and an α-olefin having from 4 to 12 carbon atoms.

Two or more kinds of propylene-ethylene copolymers and two or more kinds of propylene-based polymers, respectively, may be used as the crystalline ethylene-propylene block copolymer (i) and the propylene-based polymer (ii).

The first segment of the crystalline ethylene-propylene block copolymer (i) preferably has an intrinsic viscosity $[\alpha]_P$ of up to 1.5 dl/g and more preferably from 0.7 to 1.5 dl/g, in view of the melt flow rate (MFR) and melt fluidity of the polypropylene resin composition.

The first segment of the crystalline ethylene-propylene block copolymer (i) usually has an isotactic pentad fraction, which is determined based on $^{13}$C-NMR, of 0.95 or more, and preferably 0.97 or more, in view of the rigidity or heat resistance of molded articles. The isotactic pentad fraction of the first segment is up to 1.

The second segment of the crystalline ethylene-propylene block copolymer (i) preferably has an intrinsic viscosity $[\eta]_{EP}$ of up to 7 dl/g, more preferably up to 6 dl/g. The $[\eta]_{EP}$ is preferably not less than 1.5 dl/g and more preferably from 1.5 to 4 dl/g for preventing the occurrence of many hard spots in molded articles.

The content $[(C2')_{EP}]$ of ethylene units in the second segment of the crystalline ethylene-propylene block copolymer (i) is preferably from 20 to 70% by weight and more preferably from 25 to 65% by weight, in view of the impact resistance of molded articles. The rest is propylene units.

Regarding the proportions of the first and second segments in the crystalline ethylene-propylene block copolymer (i), the proportion of the second segment, which is a ethylene-propylene random copolymer portion, is preferably from 5 to 50% by weight (in other words, the proportion of the first segment, which is a propylene-based polymer portion, is preferably from 50 to 95% by weight) in view of the impact resistance, rigidity and heat resistance of molded articles. More preferably, the proportion of the second segment is from 5 to 40% by weight (in other words, the proportion of the first segment is from 60 to 95% by weight).

The intrinsic viscosity $[\eta]_P$ of the propylene-based polymer (ii) is preferably up to 2.0 dl/g and more preferably from 0.7 to 1.5 dl/g in view of the melt flow rate (MFR) or melt fluidity of the polypropylene resin composition.

In view of the rigidity and heat resistance of molded articles, the propylene-based polymer (ii) is preferably a propylene homopolymer, especially a propylene homopolymer having an isotactic pentad fraction, determined using $^{13}$C-NMR, of not less than 0.95 but up to 1.

The methods for producing the crystalline ethylene-propylene block copolymer (i) and the propylene-based polymer (ii) may be produced by a conventional polymerization technique using a conventional polymerization catalyst.

The polypropylene resin (C) to be used in the preparation of a polypropylene resin composition of the present invention may contain inorganic filler, resins other than the crystalline ethylene-propylene block copolymer (i) and the propylene polymer (ii), such as ethylene-α-olefin copolymers, etc.

The polypropylene resin composition of the present invention is preferably a polypropylene resin composition containing the propylene-based polymer of the present invention explained supra, the polypropylene resin (C) mentioned above, a propylene homopolymer (D), an elastomer (E) and an inorganic filler (F) in view of mechanical properties, such as rigidity and impact resistance, of molded articles obtained therefrom.

The contents of the polypropylene resin (C), the propylene homopolymer (D), the elastomer (E) and the inorganic filler (F) are from 0.5 to 10% by weight, from 5 to 99.2% by weight, from 0.1 to 20% by weight, from 0.1 to 35% by weight and from 0.1 to 30% by weight, respectively. These amounts are based on the weight of the whole polypropylene resin composition and are combined to be 100% by weight.

Regarding the preferable contents of those ingredients, the content of the propylene-based polymer is preferably from 0.5 to 7.0% by weight. The content of the polypropylene resin (C) is preferably from 30 to 90% by weight. The content of the propylene homopolymer (D) is preferably from 5 to 20% by weight. The content of the elastomer (E) is from 5 to 30% by weight. The content of the inorganic filler (F) is preferably from 5 to 25% by weight.

The intrinsic viscosity $[\eta]_D$ of the propylene homopolymer (D) is preferably up to 2 dl/g.

Preferable examples of elastomer (E) include: (1) vinyl aromatic compound-containing rubber, (2) ethylene-propylene random copolymer rubber, (3) ethylene-α-olefin random copolymer rubber, and elastomers comprising their mixture.

Examples of the vinyl aromatic compound-containing rubber (1) include: (A) block copolymers comprising vinyl aromatic compound polymer blocks and olefin polymer blocks or block copolymers obtained by their hydrogenation, and (B) block copolymers comprising vinyl aromatic compound polymer blocks and conjugated diene polymer blocks, or block copolymers obtained by their hydrogenation. Moreover, a rubber obtained by reacting a vinyl aromatic compound, such as styrene, with an ethylene-propylene-nonconjugated diene rubber (EPDM) is also available. Those polymers and rubbers may be used alone as the vinyl aromatic compound-containing rubber (1) though they may be used in combination.

Examples of (A) the block copolymers comprising vinyl aromatic compound polymer blocks and olefin polymer blocks or block copolymers obtained by their hydrogenation include block copolymers, such as styrene-ethylene-butene-styrene rubber (SEBS), styrene-ethylene-propylene-styrene rubber (SEPS), and block copolymers obtained by their hydrogenation.

Examples of (B) the block copolymers comprising vinyl aromatic compound polymer blocks and conjugated diene polymer blocks or block copolymers obtained by their hydrogenation include block copolymers, such as styrene-butadiene rubber (SBR), styrene-butadiene-styrene rubber (SBS) and styrene-isoprene-styrene rubber (SIS), and block copolymers obtained by their hydrogenation. For (B) the block copolymers obtained by hydrogenation of the block copolymers comprising vinyl aromatic compound polymer blocks and conjugated diene polymer blocks, the rate of hydrogenation of the double bonds contained in the structure derived from conjugated diene is preferably 80% or more and more preferably 85% or more.

The molecular weight distribution (i.e. Q value), determined by GPC (gel permeation chromatography), of the vinyl aromatic compound-containing rubber (1) is preferably from 1.0 to 2.5 and more preferably from 1.0 to 2.3.

The content of vinyl aromatic compounds contained in the vinyl aromatic compound-containing rubber (1) is preferably from 10 to 20% by weight, and more preferably from 12 to 19% by weight.

The melt flow rate (measured at 230° C. according to JIS K6758) of the vinyl aromatic compound-containing rubber (1) is preferably from 1 to 15 g/10 min, and more preferably from 2 to 13 g/10 min.

The method for producing the vinyl aromatic compound-containing rubber (1) may be a method in which an aromatic vinyl compound is bonded to an olefinic copolymer rubber or a conjugated diene rubber by polymerization, reaction, etc.

The molecular weight distribution (i.e. Q value), determined by GPC (gel permeation chromatography), of the ethylene-propylene random copolymer rubber (2) for use in the elastomer (E) is preferably up to 2.7, more preferably from 1.0 to 2.7, and even more preferably from 1.5 to 2.5.

The propylene content of the ethylene-propylene random copolymer rubber (2) is preferably from 20 to 30% by weight, and more preferably from 22 to 28% by weight.

The melt flow rate (measured at 190° C. according to JIS K6758) of the ethylene-propylene random copolymer rubber (2) is preferably from 1 to 15 g/10 min, and more preferably from 2 to 13 g/10 min.

Examples of the α-olefin in the ethylene-α-olefin random copolymer rubber (3) for use as the elastomer (E) include α-olefins having from 4 to 12 carbon atoms, such as butene-1, pentene-1, hexene-1, heptene-1, octene-1 and decene. Preferred are butene-1, hexene-1 and octene-1.

Examples of the ethylene-α-olefin random copolymer rubber (3) include ethylene-butene-1 random copolymer rubber, ethylene-hexene-1 random copolymer rubber and ethylene-octene-1 random copolymer rubber. Preferred are ethylene-octene-1 random copolymer rubber and ethylene-butene-1 random copolymer rubber. A single species of the ethylene-α-olefin random copolymer rubber (3) may be used. Alternatively, two or more species thereof may be used in combination.

The molecular weight distribution (i.e. Q value), determined by GPC (gel permeation chromatography), of the ethylene-octene-1 random copolymer rubber for use in the elastomer (E) is preferably up to 2.5, more preferably from 1.0 to 2.5, and even more preferably from 1.5 to 2.3.

The octene-1 content of the ethylene-octene-1 random copolymer rubber is preferably from 15 to 50% by weight, and more preferably from 30 to 47% by weight.

The melt flow rate (measured at 190° C. according to JIS K6758) of the ethylene-octene-1 random copolymer rubber is preferably from 0.1 to 15 g/10 min, and more preferably from 2 to 13 g/10 min.

The molecular weight distribution (i.e. Q value), determined by GPC (gel permeation chromatography), of the ethylene-butene-1 random copolymer rubber for use in the elastomer (E) is preferably up to 2.7, more preferably from 1.0 to 2.7, and even more preferably from 1.5 to 2.5.

The butene-1 content of the ethylene-butene-1 random copolymer rubber is preferably from 15 to 40% by weight, and more preferably from 20 to 35% by weight.

The melt flow rate (measured at 190° C. according to JIS K6758) of the ethylene-butene-1 random copolymer rubber is preferably from 0.1 to 15 g/10 min, and more preferably from 0.3 to 13 g/10 min.

The methods for producing the ethylene-propylene random copolymer rubber (2) and the ethylene-α-olefin random copolymer rubber (3) may be methods in which ethylene and propylene or ethylene and α-olefin are copolymerized using a conventional catalyst and a conventional polymerization technique.

Examples of the catalyst include catalyst systems comprising a vanadium compound and an organoaluminum compound, Ziegler-Natta catalyst systems and metallocene catalyst systems.

Examples of the conventional polymerization techniques include solution polymerization, slurry polymerization, high pressure ion polymerization and gas phase polymerization.

The inorganic filler (F), which serves to increase rigidity, may, for example, be calcium carbonate, barium sulfate, mica, crystalline calcium silicate, talc and magnesium sulfate fibers. Preferred are talc and magnesium sulfate fibers. A single species of the inorganic filler may be used. Alternatively, two or more species thereof may be used in combination.

The talc for use as the inorganic filler (F) is preferably pulverized hydrous magnesium silicate. The crystal structure of the molecule of the hydrous magnesium silicate is a pyrophyllite type three-layer structure. Talc comprises a lamination of this structure and preferably is a tabular powder obtained by fine pulverization of its crystals almost into its unit layers.

The talc preferably has an average particle diameter of 3 μm or less. The average particle diameter of the talc refers to a 50% equivalent particle diameter $D_{50}$, which is obtained from an integral distribution curve of the minus sieve method in which talc is suspended in a liquid medium, such as water and alcohol, using a centrifugal sedimentation type particle distribution analyzer.

While inorganic filler (F) may be used without any treatment, it may be surface-treated with a coupling agent, such as silane coupling agents, titanium coupling agent, higher fatty acids, higher fatty acid esters, higher fatty acid amides and higher fatty acid salts, or a surfactant in order to improve the interfacial adhesion with the polypropylene resin (C) and the dispersibility of talc particles in the polypropylene resin (C).

The magnesium sulfate fibers for use as the inorganic filler (F) preferably have an average length of from 5 to 50 μm, and more preferably from 10 to 30 μm. The average diameter of the magnesium sulfate fibers is preferably from 0.3 to 2 μm, and more preferably from 0.5 to 1 μm.

The melt flow rate of the polypropylene resin composition of the present invention is preferably from 5 to 150 g/10, and more preferably from 10 to 120 g/10 min in view of the moldability, impact resistance or control of flow mark occurrence.

The polypropylene resin composition of the present invention preferably has a die swell of from 1.5 to 2.0 in view of appearance of flow marks occurring in the surface of molded articles.

The method for the production of the polypropylene resin composition of the present invention may be a method comprising mixing the propylene-based polymer of the present invention and the polypropylene resin (C). The method of the mixing may use a kneading machine such as a single-screw extruder, a twin-screw extruder, a Banbury mixer and hot rolls. More specifically, the following methods (1) to (3) are available.

(1) A method comprising kneading a powder of the propylene-based polymer of the present invention and a powder of the polypropylene resin (C) using the kneading machine.

(2) A method comprising kneading a powder of the propylene-based polymer of the present invention and a powder of the polypropylene resin (C) separately using a single- or twin-screw extruder to form respective pellets, and then, the pellets of the propylene-based polymer of the present invention and the pellets of the polypropylene resin (C) are kneaded together in a single- or twin-screw extruder.

(3) A method comprising feeding, by use of a quantitative feeder, the propylene-based polymer pelletized previously with a single- or twin-screw extruder into a kneading machine during a step of pelletizing a powder of the polypropylene resin composition (C) and then kneading the mixture.

It is preferable to use methods (2) and (3), which use pellets of the propylene-based polymer kneaded previously with a single- or twin-screw extruder.

As needed, the single- or twin-screw extruder may have a die equipped with a screen pack. The screen pack preferably is a metal fiber-sintered filter, which is disclosed, for example, in Takao Takasaka, "Design of Machine", vol. 25, pp. 109–113, published in March, 1981 by The Nikkan Kobyo Shimbun, Ltd.

The kneading temperature is usually from 170 to 250° C., and preferably from 190 to 240° C.

The polypropylene resin composition of the present invention may contain additives. Examples of the additives include antioxidants, UV absorbers, lubricants, pigments, antistatic agents, copper inhibitors, flame retardants, neutralizing agents, foaming agents, plasticizers, nucleating agents, foam inhibitors and crosslinking agents. In order to improve heat resistance, weather resistance and stability against oxidation, it is preferable to add an antistatic agent or a UV absorber.

For compounding such additives, the elastomer (E) or the inorganic filler (F), a method comprising kneading those additives, the elastomer (E) or the inorganic filler (F) with a polypropylene resin composition which was previously melt-kneaded and pelletized is available.

Another available option is a method comprising, during the pelletization of the polypropylene resin composition, kneading a powder of the propylene-based polymer of the present invention or a powder of the polypropylene resin (C) with those additives, the elastomer (E) or the inorganic filler (F) to compound them.

The injection-molded article of the present invention is made of the polypropylene resin composition of the present invention. The article is obtained by molding the polypropylene resin composition of the present invention using a conventional injection molding method. Examples of the applications of the injection molded article include door trims, pillars, instrument panels and bumpers.

EXAMPLES

The present invention is described by way of Examples and Comparative Examples. However, the invention is not restricted to the Examples.

The physical properties of the polymers and compositions used in the Examples and the Comparative Examples were measured by the methods shown below.

(1) Intrinsic Viscosity (Unit: dl/g)

Reduced viscosities were measured at three concentrations of 0.1, 0.2 and 0.5 g/dl using a Ubbelohde viscometer. The intrinsic viscosity was calculated by the method described in "Polymer Solution, Polymer Experiments vol. 11 (Kobunshi Yoeki, Kobunshi Jikkengaku 11, page 491, published by Kyoritsu Shuppan Co., Ltd., 1982), that is, by an extrapolation method in which reduced viscosities are plotted against concentrations and the concentration is extrapolated in zero.

(1-1) Intrinsic Viscosity of Crystalline Ethylene-Propylene Block Copolymer Used as Polypropylene Resin (C)

(1-1a) Intrinsic Viscosity of Propylene Homopolymer Portion (First Segment of the Copolymer): $[\eta]_P$ The intrinsic viscosity $[\eta]_P$ of the propylene homopolymer portion, which is the first segment, of a crystalline ethylene-propylene block copolymer was measured as follows. In the course of the production of the crystalline ethylene-propylene block copolymer, a propylene homopolymer was sampled from a polymerization reactor after the polymerization for forming the propylene homopolymer (i.e. the first step). The propylene homopolymer sampled was measured for its intrinsic viscosity $[\eta]_P$.

(1-1b) Intrinsic Viscosity of Ethylene-Propylene Random Copolymer Portion (Second Segment of the Copolymer): $[\eta]_{EP}$ The intrinsic viscosity $[\eta]_{EP}$ of the ethylene-propylene random copolymer portion, which is the second segment, of a crystalline ethylene-propylene block copolymer was determined by measuring the intrinsic viscosity $[\eta]_P$ of the propylene homopolymer portion and the intrinsic viscosity $[\eta]_T$ of the crystalline ethylene-propylene block copolymer. The equation shown below is used to calculate the intrinsic viscosity $[\eta]_{EP}$ using the weight ratio X of the ethylene-propylene random copolymer portion to the crystalline ethylene-propylene block copolymer, wherein the weight ratio X was determined using the method described in (2) infra:

$$[\eta]_{EP}=[\eta]_T/X-(1/X-1)[\eta]_P$$

wherein $[\eta]_P$=the intrinsic viscosity (dl/g) of the propylene homopolymer portion, $[\eta]_T$=the intrinsic viscosity (dl/g) of the crystalline ethylene-propylene block copolymer, and X=the weight ratio of the ethylene-propylene random copolymer portion to the crystalline ethylene-propylene block copolymer.

(1-2) Intrinsic Viscosity of Propylene Homopolymer: $[\eta]_P$

The intrinsic viscosity $[\eta]_P$ of the propylene homopolymer used in a polypropylene resin (C) or in a polypropylene resin composition was determined by the method (1) described above.

(1-3) Intrinsic Viscosity of Propylene Homopolymer (1-3a) Intrinsic Viscosity of Propylene-Ethylene Random Copolymer Portion (A): $[\eta]_A$ The intrinsic viscosity $[\eta]_A$ of the propylene-ethylene random copolymer portion, which is the first segment, of a propylene-based polymer was measured as follows. In the course of the production of the propylene-based polymer, a propylene-ethylene random copolymer was sampled from a polymerization reactor after the polymerization for forming the propylene-ethylene random copolymer (i.e. the first step). The propylene-ethylene random copolymer sampled was measured for its intrinsic viscosity $[\eta]_A$.

(1-3b) Intrinsic Viscosity of Propylene-Based Polymer Portion (B) Obtained by Polymerizing Monomers Mainly Comprising Propylene: $[\eta]_B$ The intrinsic viscosity $[\eta]_B$ of the propylene-based polymer portion (B) obtained by polymerizing monomers mainly comprising propylene was determined by measuring the intrinsic viscosity $[\eta]_A$ of the propylene-ethylene random copolymer portion (A) and the intrinsic viscosity $[\eta]_T$ of the whole propylene-based polymer. The equation shown below is used to calculate the intrinsic viscosity $[\eta]_B$ using the weight ratio $X_B$ of the propylene-based polymer portion (B) obtained by polymerizing monomers mainly comprising propylene to the whole propylene-based polymer, wherein the weight ratio $X_B$ was determined based on the amounts of the propylene-ethylene random copolymer portion (A) and the whole propylene-based polymer for a unit time:

$$[\eta]_B=[\eta]_T/X_B(1/X_B-1)[\eta]_A$$

wherein $[\eta]_A$=the intrinsic viscosity (dl/g) of the propylene-ethylene random copolymer portion (A), and $[\eta]_T$=the intrinsic viscosity (dl/g) of the whole propylene-based polymer.

(2) Weight Ratio of Ethylene-Propylene Random Copolymer Portion to the Whole Crystalline Ethylene-Propylene Block Copolymer: X The weight ratio X of the ethylene-propylene random copolymer portion to the whole crystalline ethylene-propylene block copolymer was obtained by measuring the crystal fusion heat of the propylene homopolymer portion (first segment) and that of the whole crystalline ethylene-propylene block copolymer and effecting a calculation using the following equation. The crystal fusion heats were measured by differential scanning calorimetry (DSC).

$$X=1-(\Delta H_f)_T/(\Delta H_f)_P$$

$(\Delta H_f)_T$: Fusion heat of the whole block copolymer (cal/g)

$(\Delta H_f)_P$: Fusion heat of the propylene homopolymer portion (cal/g)

(3) Ethylene Content of Ethylene-Propylene Random Copolymer Portion of Crystalline Ethylene-Propylene Block Copolymer in Polypropylene Resin (C): $(C_2')_{EP}$ The ethylene content $(C_2')_{EP}$ of the ethylene-propylene random copolymer portion of the crystalline ethylene-propylene block copolymer in a polypropylene resin (C) was determined by measuring the ethylene content $(C_2')_T$ of the whole crystalline ethylene-propylene block copolymer by infrared absorption spectrometry and effecting a calculation using the following equation:

$$(C_2')_{EP}=(C_2')_T/X$$

wherein $(C_2')_T$: the ethylene content (wt %) of the whole block copolymer, $(C_2')_{EP}$: the ethylene content (wt %) of ethylene-propylene random copolymer portion, and X=the weight ratio of the ethylene-propylene random copolymer portion to the crystalline ethylene-propylene block copolymer.

(4) Ethylene Content (% by Weight) of Propylene-Ethylene Random Copolymer Portion (A)

The ethylene content of the propylene-ethylene random copolymer portion was determined by infrared spectrometry using the method disclosed from page 616 of "Polymer Handbook" (published in 1995 by Kinokuniya Co., Ltd.).

(5) Melt Flow Rate (MFR, Unit: g/10 min)

The melt flow rate was measured, unless otherwise stated, at a temperature of 230° C. under a load of 2.16 kgf according to the method provided in JIS K6758.

(6) Die Swell

The die swell was measured with a Capirograph 1B manufactured by Toyo Seiki Seisaku-sho, Ltd under the following conditions:
temperature: 220° C.
L/D: 40
shear rate: $2.432 \times 10^3$ sec$^{-1}$ (7) Preparation of Injection-Molded Article for Appearance Evaluation Specimens, which were the injection-molded articles for use in the appearance evaluations (8)–(11) described infra, were prepared by the following method.

Figure 1:
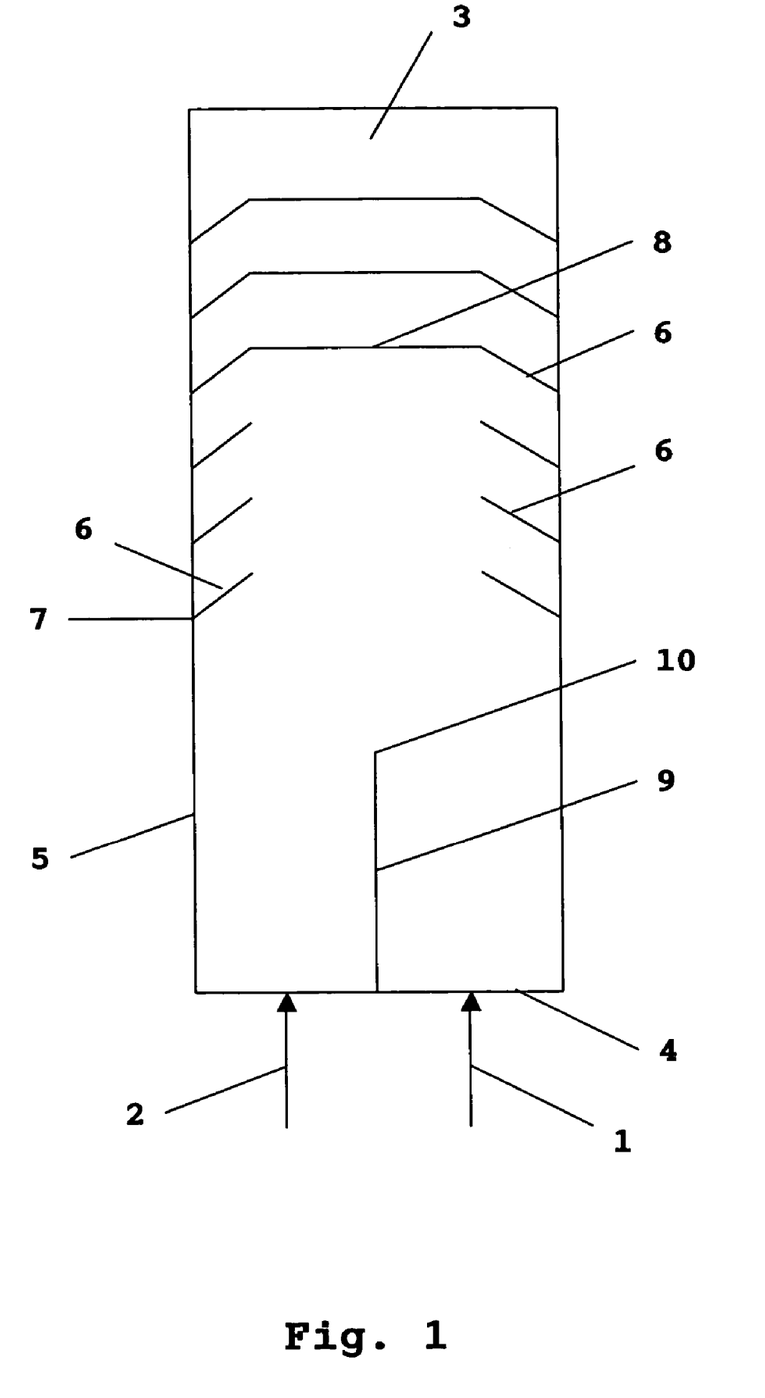
FIG. 1 is a plane view showing a flat molded article for use in evaluation of appearance.

Using an injection molding machine NEOMAT 515/150 manufactured by Sumitomo Heavy Industries, Ltd. and a mold which had a size of 100 mm×400 mm×3.0 mm with a parallel two-point gate, molding was carried out at a molding temperature of 200° C. to yield a flat molded article shown in FIG. 1. In FIG. 1, numerals 1 and 2 each indicate a gate of a two-point gate, numeral 3 indicates a flat molded article, numeral 4 indicates a front edge of the molded article, and numeral 5 indicates a side edge of the molded article. Also in FIG. 1, numeral 6 indicates a flow mark, numeral 7 indicates a position where flow marks 6 started to appear in the side edge of the molded article, numeral 8 indicates a position where flow marks 6 started to appear on the center of the molded article, numeral 9 indicates a weld, and numeral 10 indicates the end of the weld.

(8) Flow Mark Appearance

Using a flat molded article prepared by the method described in (7) supra, flow marks were visually observed. As shown in FIG. 1, the distance (mm) from the front edge 4 of the molded article 3 formed in front of gates 1, 2 of a mold (not shown) to a position 7 where flow marks 6 started to appear in the side edge 5 of the molded article 3, which position is referred to as flow mark occurring position A. Further, the distance (mm) from the front edge 4 of the molded article 3 to a position 8 where flow marks 6 started to appear on the center of the molded article 3, which position is referred to as flow mark occurring position B, were measured and the degree of noticeability of flow marks 6 (streaks) were observed. The longer the distance from the front edge 4 of the molded article 3 to a position 7 or 8 where flow marks 6 started to appear or the less noticeable the flow marks 6, the better the flow mark appearance.

(9) Weld Appearance

Using the flat molded article prepared by the method of (7) above, the weld appearance was evaluated. Specifically, the length of a weldline 9 shown in FIG. 1, namely, the distance from the front end 4 of the molded article 3 to the end 10 of the weldline, was measured. The shorter the weldline 9, the better the weld appearance.

(10) Hard Spots in Molded Article

Using the flat molded article prepared by the method of (7) above, the presence of hard spots was visually checked.

(11) Sink Marks (Facial Strain) at Flow Front

Using the flat molded article prepared by the method of (7) above, the degree of unevenness which occurred in the rear side of the molded article at the flow front away from the gate was visually observed. In addition, a holding pressure necessary for forming no unevenness in the rear side of the molded article (holding pressure necessary for filling, unit: kg/cmG) was determined. The smaller the holding pressure necessary for filling, the better the appearance.

The methods for preparing the three solid catalyst components (I), (II) and (III) used for the production of the polymers used in the Examples and the Comparative Examples are described below.

(1) Solid Catalyst Component (I)

Following replacement of the atmosphere in a 200-L SUS reactor equipped with a stirrer by nitrogen, 80 L of hexane, 6.55 mol of tetrabutoxytitanium, 2.8 mol of diisobutyl phthalate and 98.9 mol of tetraethoxysilane were fed to form a homogeneous solution. Then, 51 L of a butylmagnesium chloride solution in diisobutyl ether at a concentration of 2.1 mol/L was dropped slowly over 5 hours while holding the temperature in the reactor at 5° C. After the dropping, the mixture was stirred at 5° C. for 1 hour and at room temperature for an additional 1 hour. Subsequently, the mixture was subjected to solid-liquid separation at room temperature and washed with 70 L toluene three times. Then, the amount of toluene was adjusted so that the slurry concentration became 0.2 kg/L and the resulting slurry was stirred at 105° C. for 1 hour. Then, the mixture was cooled to 95° C. and 47.5 mol of diisobutyl phthalate was added, followed by a reaction at 95° C. for 30 minutes. After the reaction, solid-liquid separation was performed and washing with toluene was repeated twice. Then, the amount of toluene was adjusted so that the slurry concentration became 0.4 kg/L, 3.1 mol of diisobutyl phthalate, 8.9 mol of di-n-butyl ether and 274 mol of titanium tetrachloride were added, followed by a reaction at 105° C. for 3 hours. After the completion of the reaction, solid-liquid separation was performed and washing with 90-L toluene at that temperature was carried out twice. The amount of toluene was adjusted so that the slurry concentration became 0.4 kg/L, 8.9 mol of di-n-butyl ether and 137 mol of titanium tetrachloride were added, followed by a reaction at 105° C. for 1 hour. After the completion of the reaction, solid-liquid separation was performed at that temperature and washing with 90-L toluene at the same temperature was carried out three times. After three additional washings with 70-L hexane, the residue was dried under reduced pressure, yielding 11.4 kg of solid catalyst component, which contained 1.83% by weight of titanium atom, 8.4% by weight of phthalate, 0.30% by weight of ethoxy group and 0.20% by weight of butoxy group. This solid catalyst component is hereinafter called solid catalyst component (I).

(2) Solid Catalyst Component (II)

Following replacement of the atmosphere in a 200-L SUS reactor equipped with a stirrer by nitrogen, 80 L of hexane, 6.55 mol of tetrabutoxytitanium, 2.8 mol of diisobutyl phthalate and 98.9 mol of tetraethoxysilane were fed to form a homogeneous solution. Then, 51 L of a butylmagnesium chloride solution in diisobutyl ether at a concentration of 2.1 mol/L was dropped slowly over 5 hours while holding the temperature in the reactor at 5° C. After the dropping, the mixture was stirred at room temperature for additional 1 hour. Subsequently, the mixture was subjected to solid-liquid separation at room temperature and washed three times with 70 L toluene. Then, the toluene was drained so that the slurry concentration became 0.6 kg/L. Thereafter, a mixture of 8.9 mol of di-n-butyl ether and 274 mol of titanium tetrachloride was added and 20.8 mol of phthalic chloride was also added. A reaction was carried out at 110° C. for 3 hours. After the completion of the reaction, the mixture was washed twice with toluene at 95° C. Then, the slurry concentration was adjusted to 0.6 kg/L, 3.13 mol of diisobutyl phthalate, 8.9 mol of di-n-butyl ether and 137 mol of titanium tetrachloride were added and then a reaction was carried out at 105° C. for 3 hours. After the completion of the reaction, the mixture was washed twice with 90-L toluene at 95° C. The slurry concentration was adjusted to 0.6 kg/L, and then 3.13 mol of diisobutyl phthalate, 8.9 mol of di-n-butyl ether and 137 mol of titanium tetrachloride were added, followed by a reaction at 105° C. for 1 hour. After the completion of the reaction, solid-liquid separation was carried out at that temperature and washing with 90-L toluene at the same temperature was carried out twice. Subsequently, after the slurry concentration was adjusted to 0.6 kg/L, 8.9 mol of di-n-butyl ether and 137 mol of titanium tetrachloride were added and the resulting mixture was reacted at 95° C. for 1 hour. After the completion of the reaction, solid-liquid separation was performed at that temperature and washing with 90-L toluene at the same temperature was carried out three times. After three additional washings with 90-L hexane, the residue was dried under reduced pressure, yielding 11.0 kg of solid catalyst component, which contained 1.89% by weight of titanium atom, 20% by weight of magnesium atom, 8.6% by weight of phthalate, 0.05% by weight of ethoxy group and 0.21% by weight of butoxy group. This solid catalyst component is hereinafter called solid catalyst component (II).

(3) Solid Catalyst Component (III)

The atmosphere in a 200-L cylindrical reactor having a diameter of 0.5 m which was equipped with a stirrer having three pairs of blades 0.35 m in diameter and also equipped with four baffle plates 0.05 m wide was replaced with nitrogen. Into the reactor, 54 L of hexane, 100 g of diisobutyl phthalate, 20.6 kg of tetraethoxy silane and 2.23 kg of tetrabutoxy titanium were charged and stirred. Then, to the stirred mixture, 51 L of a solution of butylmagnesium chloride in dibutyl ether (concentration=2.1 mol/L) was dropped over 4 hours while the temperature inside the reactor was held at 7° C. The stirring speed during this operation was 150 rpm. After the completion of the dropping, the mixture was stirred at 20° C. for 1 hour and then was filtered. The resulting solid was washed three times with 70-L of toluene at room temperature. Toluene was added to the solid to yield a solid catalyst component precursor slurry. The solid catalyst component precursor contained 1.95% by weight of Ti, 35.6% by weight of OEt (ethoxy group), and 3.5% by weight of OBu (butoxy group). It had an average particle diameter of 39 μm and contained fine powder component with a diameter of up to 16 μm in an amount of 0.5% by weight. Then, toluene was drained so that the slurry volume became 49.7 L and the residue was stirred at 80° C. for 1 hour. After that, the slurry was cooled to a temperature of 40° C. or lower and a mixture of 30 L of titanium tetrachloride and 1.16 kg of dibutyl ether was added under stirring. Moreover, 4.23 kg of orthophthalyl chloride was charged. After being stirred for 3 hours at a temperature inside the reactor of 110° C., the mixture was filtered and the resulting solid was washed three times with 90-L of toluene at 95° C. Toluene was added to the solid to form a slurry, which was left stand. Toluene was then drained so that the slurry volume became 49.7 L. Thereafter, a mixture of 1.16 kg of dibutyl ether and 0.87 kg of diisobutyl phthalate was charged. After being stirred for 1 hour at a temperature inside the reactor of 105° C., the mixture was filtered and the resulting solid was washed twice with 90-L of toluene at 95° C. Toluene was added to the solid to form a slurry, which was left to stand. Toluene was then drained so that the slurry volume became 49.7 L. Thereafter, a mixture of 15 L of titanium tetrachloride and 1.16 kg of dibutyl ether was charged. After being stirred for 1 hour at a temperature inside the reactor of 105° C., the mixture was filtered and the resulting solid was washed twice with 90-L of toluene at 95° C. Toluene was added to the solid to form a slurry, which was left to stand. Toluene was then drained so that the slurry volume became 49.7 L. Thereafter, a mixture of 15 L of titanium tetrachloride and 1.16 kg of dibutyl ether was charged. After being stirred for 1 hour at a temperature inside the reactor of 105° C., the mixture was filtered and the resulting solid was washed three times with 90-L of toluene at 95° C. and washed twice with 90-L of hexane. The resulting solid component was dried to yield a solid catalyst component, which contained 2.1% by weight of Ti and 10.8% by weight of phthalate component. This solid catalyst component is hereinafter called solid catalyst component (III).

[Polymerization to Polymer]

(1) Polymerization to Propylene Homopolymer (HPP)

(1-1) Polymerization to HPP-1

(1-1a) Preliminary Polymerization

In a 3-L SUS autoclave equipped with a stirrer, 25 mmol/L of triethylaluminum (hereinafter abbreviated as TEA) and cyclohexylethyldimethoxysilane (hereinafter abbreviated as CHEDMS) as an electron-donating component in a CHEDMS-to-TEA ratio of 0.1 (mol/mol) and also 15 g/L of the solid catalyst component (I) were added to hexane which had been fully dehydrated and degassed. Subsequently, a preliminary polymerization was carried out by feeding propylene continuously until the amount of the propylene became 2.5 g per gram of the solid catalyst while keeping the temperature at 15° C. or lower. The resulting preliminary polymer slurry was transferred to a 120-L SUS dilution tank with a stirrer, diluted by addition of a fully refined liquid butane, and preserved at a temperature of 10° C. or lower.

(1-1b) Main Polymerization

In a fluidized bed reactor having a capacity of 1 m$^3$, equipped with a stirrer, propylene and hydrogen were fed so as to keep a polymerization temperature of 80° C., a polymerization pressure of 1.8 MPa-G and a hydrogen concentration in the gas phase of 21.5 vol % relative to propylene. Continuous gas phase polymerization was conducted while continuously feeding 33 mmol/h of TEA, 3.3 mmol/h of CHEDMS and 1.24 g/h of the preliminary polymer slurry prepared in (1-1a) as solid catalyst components. Thus, 19.6 kg/h of polymer was obtained. The resulting polymer had an intrinsic viscosity $[\eta]_P$ of 0.70 dl/g.

(1-2) Polymerization to HPP-2

(1-2a) Preliminary Polymerization

The preliminary polymerization was carried out in the same manner as HPP-1 except the solid catalyst component was changed to a solid catalyst component (III) and the electron-donating compound was changed to tert-butyl-n-propyldimethoxysilane (hereinafter abbreviated as tBunPrDMS).

(1-2b) Main Polymerization

The main polymerization was carried out in the same manner as HPP-1 except the electron-donating compound in the main polymerization was changed to tBunPrDMS and the hydrogen concentration in the gas phase and the amount of the solid catalyst component supplied were adjusted so that the polymer given in Table 1 can be obtained. The results of the analysis of the resulting polymer are shown in Table 1.

(1-3) Polymerization to HPP-3

The main polymerization was carried out in the same manner as HPP-1 except the hydrogen concentration in the gas phase and the amount of the solid catalyst component supplied were adjusted so that the polymer given in Table 1 can be obtained. The results of the analysis of the resulting polymer are shown in Table 1.

(2-1a) Preliminary Polymerization

The preliminary polymerization was carried out in the same manner as HPP-1 except the solid catalyst component was changed to a solid catalyst component (III) and the electron-donating compound was changed to tert-butyl-n-propyldimethoxysilane (hereinafter abbreviated as tBunPrDMS).

(2-1b) Main Polymerization

Two fluidized bed reactors having a capacity of 1 m³ equipped with a stirrer were placed in series. The main polymerization was carried out by a method in which a propylene polymer portion was polymerized in a first reactor and then was transferred to a second reactor without being deactivated and a propylene-ethylene copolymer portion was continuously polymerized in a gas phase in the second reactor. In the first reactor in the former step, propylene and hydrogen were fed so as to keep a polymerization temperature of 80° C., a polymerization pressure of 1.8 MPa-G and a hydrogen concentration in the gas phase of 18.8 vol % relative to propylene. Under this condition, a continuous polymerization was carried out while 43 mmol/h of TEA, 6.8 mmol/h of tBunPrDM and 1.13 g/h of the preliminary polymer slurry prepared in (2-1a) as a solid catalyst component were fed, affording 15.3 kg/h of polymer. The polymer had an intrinsic viscosity $[\eta]_P$ of 0.79 dl/g. The discharged polymer was fed continuously to the second reactor to the latter step without being deactivated. In the second reactor in the latter step, propylene, ethylene and hydrogen were continuously fed so as to keep a polymerization temperature of 65° C., a polymerization pressure of 1.4 MPa-G, a hydrogen concentration in the gas phase of 9.8 vol % relative to the whole monomers (propylene+ethylene) and an ethylene concentration of 50 vol % relative to propylene. Under this condition, a continuous polymerization was continued. Thus, 22.1 kg/h of polymer was obtained. The resulting polymer had an intrinsic viscosity $[\eta]_T$ of 1.12 dl/g and the polymer content (EP content) in the latter step portion was 31% by weight. Therefore, the polymer produced in the latter step portion (EP portion) had an intrinsic viscosity $[\eta]_{EP}$ of 1.9 dl/g. The ethylene content of the EP portion was 41% by weight.

(2-2) Polymerizations to BCPP-2 to BCPP-4

Polymerizations were carried out in the same manner as BCPP-1 except the hydrogen concentration and the ethylene concentration in the gas phase and the amount of the solid catalyst component supplied were adjusted so that the polymers given in Table 1 were formed. The results of the analysis of the resulting polymer are shown in Table 1.

The $[\eta]_P$, the $[\eta]_{EP}$, the ethylene content in EP and the EP content shown in Table 1 are analytic values of powders of the propylene homopolymers (HPP-1 to HPP-3) and the propylene-ethylene block copolymers (BCPP-1 to BCPP-4) obtained in the polymerizations described supra.

(3) Preparation of Propylene-Based Polymer (HMS)

(3-1) Preparation of HMS-1

(3-1a) Preliminary Polymerization

In a 3-L SUS autoclave equipped with a stirrer, 35 mmol/L of triethylaluminum (hereafter abbreviated TEA), tert-butyl-n-propyldimethoxysilane (hereafter abbreviated tBunPrDMS) as a proton donor component, wherein tBunPrDMS/TEA=0.15 (mol/mol), and 14.7 g/L of solid catalyst component (II) were added to hexane which had been fully dewatered and degassed. Subsequently, a preliminary polymerization was carried out by feeding propylene continuously until the amount of the propylene became 1.0 g per gram of the solid catalyst while keeping the temperature at 15° C. or lower. The resulting preliminary polymer slurry was transferred to a 120-L SUS dilution tank with a stirrer, diluted by addition of a fully refined liquid butane, and preserved at a temperature of 10° C. or lower.

(3-1b) Main Polymerization

In a 300-L SUS polymerization reactor equipped with a stirrer, liquefied propylene was fed at a rate of 45 kg/h so as to keep a polymerization temperature of 60° C. and a slurry amount of 95 L. Furthermore, ethylene was fed so as to keep an ethylene concentration in the gas phase of 2.7 vol % relative to propylene. A continuous copolymerization of propylene-ethylene was conducted in the substantial absence of hydrogen while feeding TEA at 2.6 mmol/h, tBunPrDMS at 0.4 mmol/h and the preliminary polymer slurry prepared in (3-1a) as a solid catalyst component at 1.1 g/h, yielding a polymer at 1.2 Kg/h. The resulting polymer was transferred continuously to a second reactor without being deactivated. In the second reactor, a SUS fluidized bed gas phase reactor having a content volume of 1 m³ equipped with a stirrer, propylene and ethylene were continuously fed so as to keep a polymerization temperature of 65° C., a polymerization pressure of 1.8 MPa-G and an ethylene concentration in a gas phase of 7.4 vol % relative to propylene. A continuous gas phase polymerization was continued using the solid catalyst component-containing polymer transferred from the first reactor in the substantial absence of hydrogen, yielding a polymer at 13.54 kg/h. The polymer produced corresponds to a propylene-ethylene random copolymer portion (A) and has an intrinsic viscosity $[\eta]_A$ of 12.1 dl/g and an ethylene content of 11.6% by weight. Subsequently, the resulting polymer was transferred continuously to a third reactor without being deactivated. In the third reactor, i.e. a SUS gas phase fluidized bed reactor having a capacity of 1 m³ equipped with a stirrer, propylene and hydrogen were continuously fed so as to keep a polymerization temperature of 75° C., a polymerization pressure of 1.4 MPa-G and a hydrogen concentration in a gas phase of 18 vol % relative to propylene. A continuous gas phase polymerization was continued using the polymer containing a solid catalyst component fed from the second reactor, yielding a polymer at a rate of 26.5 kg/h. The polymer produced is HMS-1 and corresponds to a propylene-based polymer. The polymer has an intrinsic viscosity $[\eta]$ of 6.6 dl/g. From the above-mentioned results, it was determined that the ratio of the total polymerization amount of the first and second reactors to the polymerization amount of the third reactor was 51:49, and the polymer produced in the third reactor had an intrinsic viscosity $[\eta]$ of 0.93 dl/g. The analysis results are shown in Table 2.

(3-2) Preparation of HMS-2

(3-2a) Preliminary Polymerization

In a 3-L SUS autoclave equipped with a stirrer, 20 mmol/L of triethylaluminum (hereafter abbreviated TEA), tert-butyl-n-propyldimethoxysilane (hereafter abbreviated tBunPrDMS) as a proton donor component, wherein tBun- PrDMS/TEA=0.05 (mol/mol), and 5.04 g/L of solid catalyst component (II) were added to hexane which had been fully dewatered and degassed. Subsequently, a preliminary polymerization was carried out by feeding propylene continuously until the amount of the propylene became 2.5 g per gram of the solid catalyst while keeping the temperature at 15° C. or lower. The resulting preliminary polymer slurry was transferred to a 120-L SUS dilution tank with a stirrer, diluted by addition of a fully refined liquid butane, and preserved at a temperature of 10° C. or lower.

(3-2b) Main Polymerization

Two fluidized bed reactors having a capacity of 1 m$^3$ equipped with a stirrer were placed in series. The main polymerization was carried out by a method comprising a continuous gas phase polymerization. In the first reactor in the former step, propylene and ethylene were fed continuously so as to keep a polymerization temperature of 65° C., a polymerization pressure of 1.8 MPa-G, in the substantial absence of hydrogen and an ethylene concentration of 5.0 vol % relative to propylene. Under this condition, a continuous polymerization was carried out while 1.6 mmol/h of TEA, 0.08 mmol/h of tBunPrDM and 0.41 g/h of the preliminary polymer slurry prepared in (2-1a) as a solid catalyst component were fed, affording 8.8 kg/h of polymer. The polymer produced corresponds to a propylene-ethylene random copolymer portion (A) and has an intrinsic viscosity $[\eta]_A$ of 10.3 dl/g and an ethylene content of 10.6% by weight. Subsequently, the resulting polymer was fed continuously to a second reactor in the latter step without being deactivated. In the second reactor in the latter step, propylene and hydrogen were continuously fed so as to keep a polymerization temperature of 80° C., a polymerization pressure of 1.4 MPa-G and a hydrogen concentration in the gas phase of 15.2 vol % relative to propylene. A continuous gas phase polymerization of propylene was continued using the polymer containing a solid catalyst component fed from the first reactor, yielding a polymer at a rate of 13.5 kg/h. The polymer produced is HMS-2 and corresponds to a propylene-based polymer. The polymer has an intrinsic viscosity $[\eta]$ of 7.0 dl/g. From the above-mentioned results, it was determined that the ratio of the polymerization amount of the first reactor to the polymerization amount of the second reactor was 65:35, and the polymer produced in the second reactor had an intrinsic viscosity $[\eta]$ of 0.91 dl/g. The analysis results are shown in Table 2.

(3-3) Polymerization to HMS-3

HMS-3 was obtained by conducting a main polymerization in the same manner as HMS-1 except changing the ethylene concentrations of the gas phases and the amount of the solid catalyst components supplied in the first and second reactors and the hydrogen concentration in the gas phase in the third reactor, during the main polymerization. The polymer produced by the second reactor corresponds to a propylene-ethylene random copolymer portion (A) and has an intrinsic viscosity $[\eta]$ of 7.8 dl/g and an ethylene content of 2.8% by weight. It was determined that the ratio of the total polymerization amount of the first and second reactors to the polymerization amount of the third reactor was 72:28, and the polymer produced in the third reactor had an intrinsic viscosity $[\eta]$ of 0.9 dl/g.

Each MFR shown in Table 2 is an MFR of pellets obtained by adding 0.05 parts by weight of calcium stearate as a stabilizer (manufactured by NOF Corp.), 0.05 parts by weight of 3,9-bis[2-{3-(3-tert-butyl-4-hydroxy-5-methylphenyl)-propionyloxy}-1,1-dimethylethyl]-2,4,8,10-tetraoxaspiro[5.5]undecane (Sumilizer GA80, manufactured by Sumitomo Chemical Co., Ltd.), and 0.05 parts by weight of bis(2,4-di-tert-butylphenyl)pentaerythritol diphosphite (Ultranox U626, manufactured by GE Specialty Chemicals) to 100 parts by weight of a powder prepared from a polymer using a 20 mmφ single-screw extruder (at 220° C., screen pack=100 mesh) and pelletizing the mixture. Each number of hard spots shown in Table 2 is the number of hard spots found in a film prepared from the pellets using a T-die extruder.

Example 1

To 100 parts by weight of a resin composition comprising 12% by weight of a propylene homopolymer powder (HPP-1) and 82% by weight of a propylene-ethylene block copolymer powder (BCPP-1), 0.05 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (Sumilizer GA80, manufactured by Sumitomo Chemical Co., Ltd.), and 0.05 parts by weight of bis(2,4-di-tert-butylphenyl)pentaerythritol diphosphite (Ultranox U626, manufactured by GE Specialty Chemicals) were added and dry-blended. Then, the blend was pelletized using a 40 mmφ single-screw extruder (at 220° C.), affording a polypropylene resin (C1).

To 100 parts by weight of a resin composition comprising 69% by weight of the polypropylene resin (C1), 2.0% by weight of pellets of the propylene-based polymer (HMS-1), 12% by weight of an ethylene-butene-1 random copolymer (manufactured by Mitsui Chemicals, Inc., commercial name: Tafmer A4050) as the elastomer (E) and 17% by weight of talc having an average particle diameter of 2.7 µm (manufactured by Hayashi Chemical Co., Ltd., commercial name: MWHST) as the inorganic filler (F), the same kinds and the same amounts of stabilizers as in the polypropylene resin (C1) were added. Then, 2.0 parts by weight of a pigment master batch (manufactured by Dainichiseika Color & Chemicals Mfg. Co., Ltd., commercial name: PPM8Q3461) was added thereto and thereafter was preliminarily mixed with a tumbler uniformly. Subsequently, the mixture was kneaded and extruded with a twin-screw kneading and extruding machine (manufactured by Technovel Corp., KZW31-30) at 230° C. at a screw rotation rate of 300 rpm. Thus, a polypropylene resin composition was produced.

In Table 3, the compounding proportions of the components, the MFR and die swell of the pelletized polypropylene resin composition, the flow mark appearance and the holding pressure necessary for filling are shown.

Example 2

A polypropylene resin composition was produced by dry-blending and pelletizing in the same manner as Example 1 using the compounding proportions of components given in Table 3 except using the polypropylene resin (C2) instead of the polypropylene resin (C1). In Table 3, the MFR, the die swell, the flow mark appearance and the holding pressure necessary for filling are shown.

The polypropylene resin (C2) was produced by adding the same kinds and the same amounts of stabilizers as in the polypropylene resin (C1) to 100 parts by weight of a resin composition comprising 7% by weight of a propylene homopolymer powder (HPP-1) and 93% by weight of a propylene-ethylene block copolymer powder (BCPP-1), dry-blending them in the same manner as in the preparation of the polypropylene resin (C1), and then pelletizing the mixture.

Comparative Examples 1–2

A polypropylene resin composition was produced by dry-blending and pelletizing in the same manner as Example 1 or Example 2 using the compounding proportions of components given in Table 3 except using the propylene-based polymer (HMS-3) instead of the propylene-based polymer (HMS-1). In Table 3, the MFR, the die swell, the flow mark appearance and the holding pressure necessary for filling, which is a measure of moldability, are shown.

To 100 parts by weight of a resin composition comprising 72.5% by weight of the polypropylene resin (C3), 2.5% by weight of pellets of the propylene-based polymer (HMS-1), 5% by weight of the propylene homopolymer (HPP-3), 10% by weight of an ethylene-butene-1 random copolymer (manufactured by Mitsui Chemicals, Inc., commercial name: Tafmer A4050) as the elastomer (E) and 10% by weight of talc having an average particle diameter of 2.7 μm (manufactured by Hayashi Chemical Co., Ltd., commercial name: MWHST) as the inorganic filler (F), the same kinds and the same amounts of stabilizers as in the polypropylene resin (C1) were added. Then, 2.0 parts by weight of a pigment master batch (manufactured by Dainichiseika Color & Chemicals Mfg. Co., Ltd., commercial name: PPMBQ3461) was added thereto and thereafter was preliminarily mixed with a tumbler uniformly. Subsequently, the mixture was kneaded and extruded with a 40 mmϕ single-screw extruder (at 220° C., Dulmage type screw, screen pack=metal fiber-sintered filter NF15N manufactured by Nippon Seisen Co., Ltd.) at 230° C. at a screw rotation rate of 300 rpm. Thus, a polypropylene resin composition was produced.

The polypropylene resin (C3) was produced by adding the same kinds and the same amounts of stabilizers as in the polypropylene resin (C1) to 100 parts by weight of a resin composition comprising 23% by weight of a propylene homopolymer powder (HPP-1), 70% by weight of a propylene-ethylene block copolymer powder (BCPP-3) and % by weight of an ethylene-propylene copolymer (manufactured by Mitsui Chemicals, Inc., commercial name: Tafmer S4030), dry-blending them in the same manner as in the preparation of the polypropylene resin (C1), and then pelletizing.

In Table 4, the compounding proportions of the components, the MFR and die swell of the pelletized polypropylene resin composition, the flow mark appearance, the weld line length and the sinking level in a molded article, which is a measure of moldability, are shown.

Example 4

A polypropylene resin composition was produced by dry-blending and pelletizing in the same manner as Example 3 using the compounding proportions of components given in Table 4 except using the propylene-based polymer (HMS-2) instead of the propylene-based polymer (HMS-1). In Table 4, the MFR, the die swell, the flow mark appearance and the weld line length and the sinking level in a molded article, which is a measure of moldability, are shown.

Example 5

A polypropylene resin composition was produced by dry-blending and pelletizing in the same manner as Example 3 using the compounding proportions of components given in Table 4 except using the polypropylene resin (C4) instead of the polypropylene resin (C1). In Table 3, the MFR, the die swell, the flow mark appearance and the weld line length and the sinking level in a molded article, which is a measure of moldability, are shown.

The polypropylene resin (C4) was produced by adding the same kinds and the same amounts of stabilizers as in the polypropylene resin (C1) to 100 parts by weight of a resin composition comprising 20% by weight of a propylene homopolymer powder (HPP-2) and 80% by weight of a propylene-ethylene block copolymer powder (BCPP-4), dry-blending them in the same manner as in the preparation of the polypropylene resin (C1), and then pelletizing the mixture.

Comparative Example 3

A polypropylene resin composition was produced by dry-blending and pelletizing in the same manner as Example 3 using the compounding proportions of components given in Table 4 except using the propylene-based polymer (HMS-3) instead of the propylene-based polymer (HMS-1). In Table 4, the MFR, the die swell, the flow mark appearance and the weld line length and the sinking level in a molded article, which is a measure of moldability, are shown.

TABLE 1

|  |  | $[\eta]_P$ (dl/g) | $[\eta]_{EP}$ (dl/g) | Ethylene content in EP (wt %) | EP content (wt %) |
|---|---|---|---|---|---|
| Propylene homopolymer | HPP-1 | 0.70 | — | — | — |
|  | HPP-2 | 0.81 | — | — | — |
|  | HPP-3 | 0.93 | — | — | — |
| Propylene-ethylene block copolymer | BCPP-1 | 0.79 | 1.9 | 41 | 31 |
|  | BCPP-2 | 0.80 | 2.3 | 32 | 29 |
|  | BCPP-3 | 0.90 | 2.3 | 40 | 29 |
|  | BCPP-4 | 0.85 | 2.7 | 44 | 32 |

TABLE 2

|  |  | HMS-1 | HMS-2 | HMS-3 |
|---|---|---|---|---|
| Propylene-ethylene random copolymer component (A) | $[\eta]_A$ (dl/g) | 12.1 | 10.3 | 7.8 |
|  | Ethylene content (wt %) | 11.6 | 10.6 | 2.8 |
|  | Weight fraction (wt %) | 51 | 65 | 72 |
| Propylene-based polymer component (B) | $[\eta]_B$ (dl/g) | 0.93 | 0.90 | 0.90 |
|  | Weight fraction (wt %) | 49 | 35 | 28 |
| Final polymer | MFR (g/10 min) | 0.06 | 0.01 | 0.04 |
|  | Number of hard spot (spot(s)/10 cm$^2$) | 361 | 7 | 0 |

TABLE 3

|  |  |  | Example 1 | Example 2 | Comparative Example 1 | Comparative Example 2 |
|---|---|---|---|---|---|---|
| Composition (wt %) | Propylene-based polymer | HMS-1 | 2.0 | 2.0 | 0 | 0 |
|  |  | HMS-3 | 0 | 0 | 2.5 | 2.5 |
|  | (C) | C-1 | 69 | 0 | 68.5 | 0 |
|  |  | C-2 | 0 | 69 | 0 | 68.5 |
|  | (E) | EBR | 12 | 12 | 12 | 12 |
|  | (F) | Talc | 17 | 17 | 17 | 17 |
| MFR (g/10 min) |  |  | 46 | 33 | 44 | 3 |
| Die swell |  |  | 1.55 | 1.50 | 1.52 | 1.50 |
| Flow mark occurring point A (mm) |  |  | 213 | 203 | 190 | 179 |
| Flow mark occurring point B (mm) |  |  | 348 | 340 | 293 | 293 |
| Flow mark noticeability *1) |  |  | ○ | Δ | Δ | X |
| Holding pressure necessary for filling (kg/cm²G) |  |  | 50 | 52 | 55 | 58 |

*1) Noticeablity of flow marks by visual observation
○: Flow marks were not noticeable.
Δ: Flow marks were moderately noticeable.
X Flow marks were noticeable.

TABLE 4

|  |  |  | Example 3 | Example 4 | Example 5 | Comparative Example 3 |
|---|---|---|---|---|---|---|
| Composition (wt %) | Propylene-based polymer | HMS-1 | 2.5 | 0 | 2.5 | 0 |
|  |  | HMS-2 | 0 | 2.0 | 0 | 0 |
|  |  | HMS-3 | 0 | 0 | 0 | 2.5 |
|  | (C) | C-3 | 72.5 | 73.0 | 0 | 72.5 |
|  |  | C-4 | 0 | 0 | 72.5 | 0 |
|  | (D) | HPP-3 | 5 | 5 | 5 | 5 |
|  | (E) | EBR | 10 | 10 | 10 | 10 |
|  | (F) | Talc | 10 | 10 | 10 | 10 |
| MFR (g/10 min) |  |  | 36 | 35 | 31 | 38 |
| Die swell |  |  | 1.74 | 1.63 | 1.71 | 1.55 |
| Flow mark occurring point A (mm) |  |  | 280 | 217 | No | 200 |
| Flow mark occurring point B (mm) |  |  | No | No | No | 365 |
| Flow mark noticeability *1) |  |  | ○ | ○ | ⊙ | Δ |
| Weld line length mm |  |  | 139 | 92 | 100 | 77 |
| Sinking in molded article *2) |  |  | ○ | ○ | ○ | Δ |
| Hard spot appearance in molded article *3) |  |  | ○ | ○ | ○ | ○ |

*1) Noticeablity of flow marks by visual observation
⊙: Almost no flow marks were found.
○: Flow marks were not noticeable.
Δ: Flow marks were moderately noticeable.
X: Flow marks were noticeable.
*2) Degree of unevenness in the rear side of a molded article
○: Almost no sinking was found.
Δ: Sinking was found in a flow front.
X: Sinking was found throughout.
*3) Hard spot appearance in molded article. (visual observation)
○: No hard spots were found.
X: Hard spots were found.

In Examples 1–5, when producing a molded article, flow marks hardly occur. In other words, high die swells are achieved and the balance between flow mark appearance and weld appearance. In addition, sinking (facial strain) hardly occurs in the surface of the molded article and an excellent injection filling property is achieved. Moreover, a few hard spots are formed, and the molded article has good appearance.

In contrast, in Comparative Examples 1–3, because the ethylene content of the propylene-ethylene random copolymer component (A) does not satisfy the requirements of the present invention, it is impossible to prevent flow marks from being noticeable sufficiently and it also is impossible to prevent sinking (strain in surface) sufficiently.

What is claimed is:

1. A propylene-based polymer comprising:
   from 51 to 75% by weight of a propylene-ethylene random copolymer component (A) having an intrinsic viscosity $[\eta]^A$, measured in tetralin at 135° C., of 5 dl/g or more and an ethylene content of not less than 8% by weight but less than 20% by weight, and from 25 to 49% by weight of a propylene-based polymer component (B) obtained by polymerizing monomers mainly comprising propylene, the component having an intrinsic viscosity $[\eta]^B$, measured in tetralin at 135° C., of 1.2 dl/g or less, wherein said amounts of the components (A) and (B) are each based on the combined weight of these components.

2. The propylene-based polymer according to claim 1, wherein the propylene-ethylene random copolymer component (A) has an intrinsic viscosity $[\eta]^A$, measured in tetralin at 135° C., of from 6.5 to 15 dl/g or more and an ethylene content of from 10 to 15% by weight.

3. The propylene-based polymer according to claim 1 or 2, wherein the propylene-based polymer has a melt flow rate (MFR) of from 0.01 to 2 g/10 min.

* * * * *